E. W. DAVIS.
MAGNETIC ORE WASHER.
APPLICATION FILED APR. 25, 1917.

1,317,557.

Patented Sept. 30, 1919.

WITNESSES:
B. Hall.
G. E. Sorensen

INVENTOR:
EDWARD W. DAVIS
BY
Paul & Paul
ATTORNEYS.

UNITED STATES PATENT OFFICE.

EDWARD W. DAVIS, OF DULUTH, MINNESOTA.

MAGNETIC ORE-WASHER.

1,317,557.  Specification of Letters Patent.  Patented Sept. 30, 1919.

Application filed April 25, 1917. Serial No. 164,396.

*To all whom it may concern:*

Be it known that I, EDWARD W. DAVIS, a citizen of the United States, resident of Duluth, county of St. Louis, State of Minnesota, have invented certain new and useful Improvements in Magnetic Ore-Washers, of which the following is a specification.

The object of my invention is to simplify and improve the apparatus shown and described in my U. S. Patent No. 1,153,037, issued September 7, 1915, wherein a magnetic force or attraction is utilized for causing comparatively light particles of ore which may be mingled with the sand or gravel of equal weight to adhere together and be precipitated, with means for separating said adhering particles from the refuse or tailings of the machine.

The invention consists generally in various constructions and combinations, all as hereinafter described and particularly pointed out in the claims.

In the accompanying drawings forming part of this specification,

Figure 1:
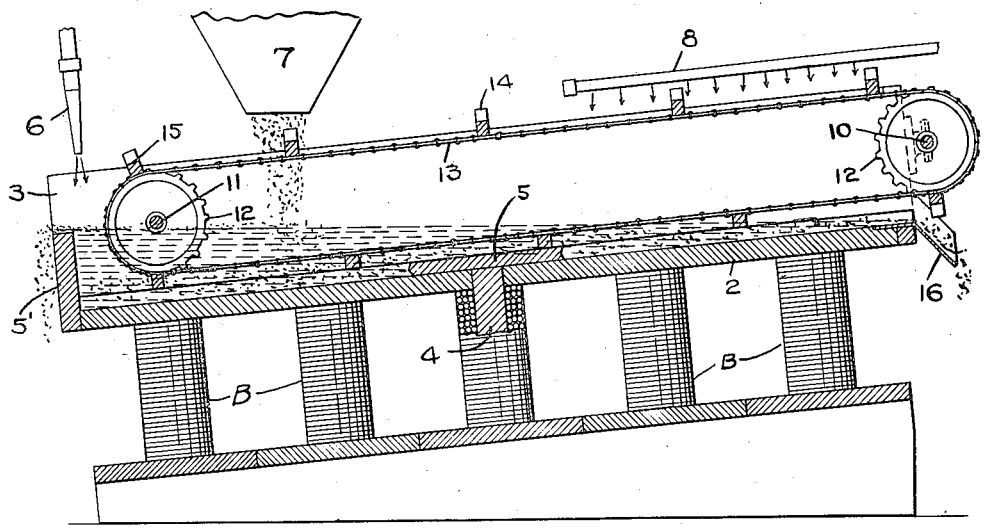
Figure 1 is a longitudinal sectional view on the line 1—1 of Fig. 2.
Figure 2:
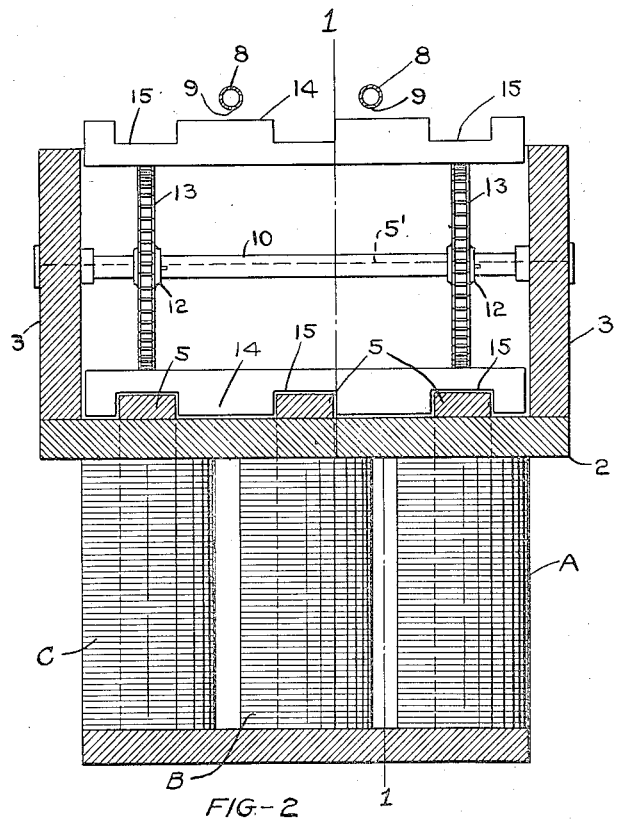
Fig. 2 is a transverse sectional view of the same.
Figure 3:
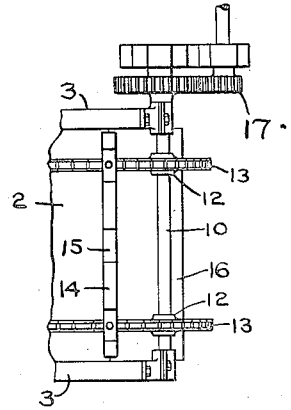
Fig. 3 is a detail plan view of the operating mechanism for the separating rake or conveyer.

In the drawing, 2 represents the bottom of the trough and 3 the side walls thereof. The trough bottom is preferably flat, as shown, and beneath it I provide rows of electro-magnets. There are preferably three of these rows, which I will designate by reference numerals A, B and C, each having a core 4 which projects up through the bottom of the trough and on each row of cores within the trough I provide pole pieces 5, there being preferably, as shown, one in the center of the trough and one near each side wall. These pole pieces become magnetized and attract the fine particles of ore which settle to the bottom of the trough by gravity and as these particles enter the fields of the magnet, they will not only be attracted thereby but will adhere together in little lumps or pellets which will cling to the surfaces of the pole pieces as the ore-bearing sand or gravel is carried through the machine. The trough is arranged on an incline, as shown, and has a tail-board 5' at the lower end, above which is a pipe 6 for a jet of water and a hopper 7 through which the ore-bearing material is delivered into the trough. Near the other end of the trough and suitably arranged above the same I prefer to provide pipes 8 having perforations 9 therein through which water is sprayed into the troughs.

For collecting the lumps or particles of ore which may be clinging to the pole pieces, I prefer to provide shafts 10 and 11 mounted transversely of the trough and having sprocket wheels 12 secured thereon for belts 13. Mounted on these belts I prefer to provide a series of rakes or scrapers 14, each having recesses 15 therein to receive the pole pieces 5, the edges of said recesses sweeping along the sides and tops of the pole pieces and scraping off the lumps or particles of ore which may be adhering thereto. These rakes also sweep over the bottom of the trough and gather up any ore which may be lying thereon.

At the upper end of the trough I prefer to provide a spout 16 positioned to receive the ore that is gathered up by the scraper blades for delivery to some suitable receptacle, not shown. The shaft 10 is connected with a suitable drive gearing 17, operated from a source of power which I have not thought necessary to illustrate.

There may be any suitable number of electro-magnets in each row, and there may be as many rows as will be found to produce the best result, and the shape of the pole pieces may be modified and the scraper blade correspondingly changed.

In the operation of the apparatus, the material to be washed will be delivered from the hopper 7 and a sufficient supply of water discharged through the pipes 8 and 6 while the movement of the blades will so agitate the sand and gravel that the ore separated therefrom may be influenced by the force of gravity and drop downwardly to the bottom of the trough, being directed by the pole pieces, and as the particles become magnetized, they will adhere to one another and form little lumps which, as the rakes operate over the pole pieces, will be carried to the upper end of the trough and there discharged. In this way I am able to effect a very thorough separation of the particles of ore from the ore-bearing sand or gravel.

I claim as my invention:

1. An ore separator comprising an inclined trough having a flat bottom and upright side walls, magnets arranged in rows beneath said bottom and having pole pieces lying on said bottom within the trough and extending lengthwise thereof, there being a middle pole piece and side pole pieces, said trough being adapted to contain a supply of water and having an overflow at its lower end and a discharge at its upper end, and a hopper for delivering ore to the lower portion of said trough, and belts operating in said trough and having scraper blades mounted transversely thereof and provided with notches to receive said pole pieces, whereby said scrapers will sweep the floor of said trough and the surfaces of said pole pieces.

2. An ore separator comprising an inclined trough, electro-magnets arranged beneath said trough and a pole piece for said magnets mounted in the bottom of said trough and extending above the surface thereof, said trough having a discharge at its upper end and an overflow at its lower end, and a hopper for delivering ore to said trough, and scrapers mounted to sweep the bottom of said trough and the top and sides of said pole piece.

3. An ore separator comprising an inclined trough, magnets arranged in rows beneath the bottom of said trough and having pole pieces extending continuously along the bottom of said trough and above the level thereof, said trough being adapted to contain a supply of water and having an overflow at its lower end and a discharge for the ore at its upper end, and a hopper for delivering ore to the lower portion of said trough, belts operating in said trough, scraper blades mounted on said belts, said blades having notches therein to receive said pole pieces, the lower edges of said blades sweeping the top and sides of said pole pieces and the bottom of said trough between said pole pieces for gathering the ore clinging thereto.

4. An ore separator comprising an inclined trough having a flat bottom and upright side walls, electro-magnets arranged beneath said trough, pole pieces for said magnets extending continuously along the bottom of said trough, the upper end of said trough having a discharge spout for the ore, a hopper for delivering ore to the lower portion of said trough, belts operating in said trough and scraper blades mounted on said belts transversely of said trough for sweeping the surfaces of said pole pieces.

In witness whereof, I have hereunto set my hand this 20th day of April 1917.

EDWARD W. DAVIS.